(12) United States Patent
Hindman

(10) Patent No.: US 8,197,015 B2
(45) Date of Patent: Jun. 12, 2012

(54) CARGO CARRYING VEHICLE WITH SAFETY SYSTEM FOR SHORE POWER CONNECTION

(75) Inventor: Donald Hindman, San Diego, CA (US)

(73) Assignee: Hyundai Translead, San Diego, CA (US)

( * ) Notice: Subject to any disclaimer, the term of this patent is extended or adjusted under 35 U.S.C. 154(b) by 761 days.

(21) Appl. No.: 12/381,555

(22) Filed: Mar. 13, 2009

(65) Prior Publication Data

US 2010/0230224 A1    Sep. 16, 2010

(51) Int. Cl.
*B60R 25/08* (2006.01)
(52) U.S. Cl. ............ 303/89; 303/123; 188/265
(58) Field of Classification Search ......... 303/123, 303/89, 3; 188/353, 265
See application file for complete search history.

(56) References Cited

U.S. PATENT DOCUMENTS

| 7,052,282 | B2 | 5/2006 | Meleck et al. |
| 7,066,529 | B2 | 6/2006 | Yurgevich et al. |
| 7,241,146 | B1 | 7/2007 | Kim et al. |
| 2006/0186730 | A1 * | 8/2006 | Coutermarsh et al. .......... 303/89 |

* cited by examiner

*Primary Examiner* — Melanie Torres Williams
(74) *Attorney, Agent, or Firm* — Wood, Phillips, Katz, Clark & Mortimer

(57) ABSTRACT

A cargo carrying vehicle has a towing unit and a storage unit defining a cargo space. The towing unit is operable to: a) advance the storage unit; and b) generate electrical power for operating at least one component on the vehicle. An input is provided for external power to be supplied to at least one of: a) charge; and b) operate the at least one component. A safety system has first and second states. With the safety system in the first state, with no external power supplied to the external power input, the towing unit can be operated to advance the storage unit. With the safety system in the second state, with external power supplied to the eternal power input, the towing unit cannot be operated to advance the storage unit.

20 Claims, 10 Drawing Sheets

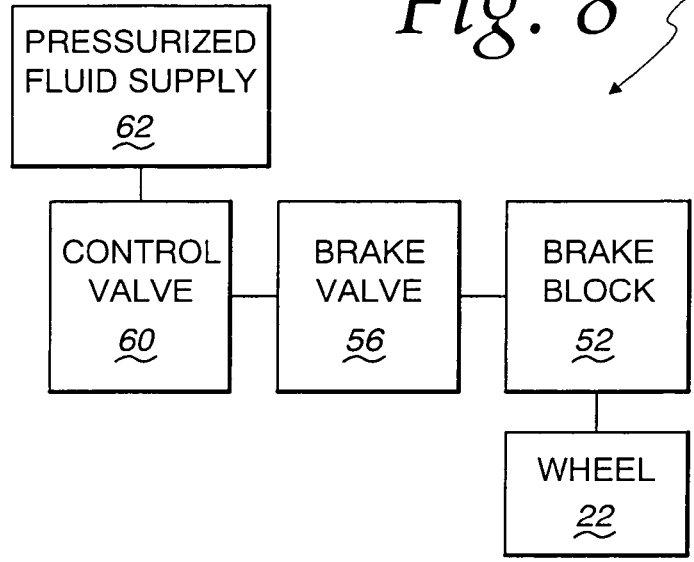
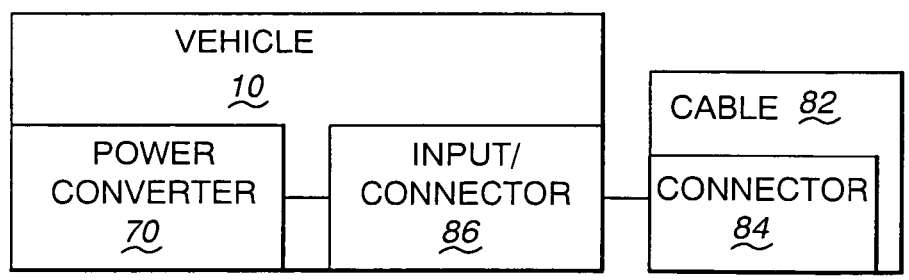

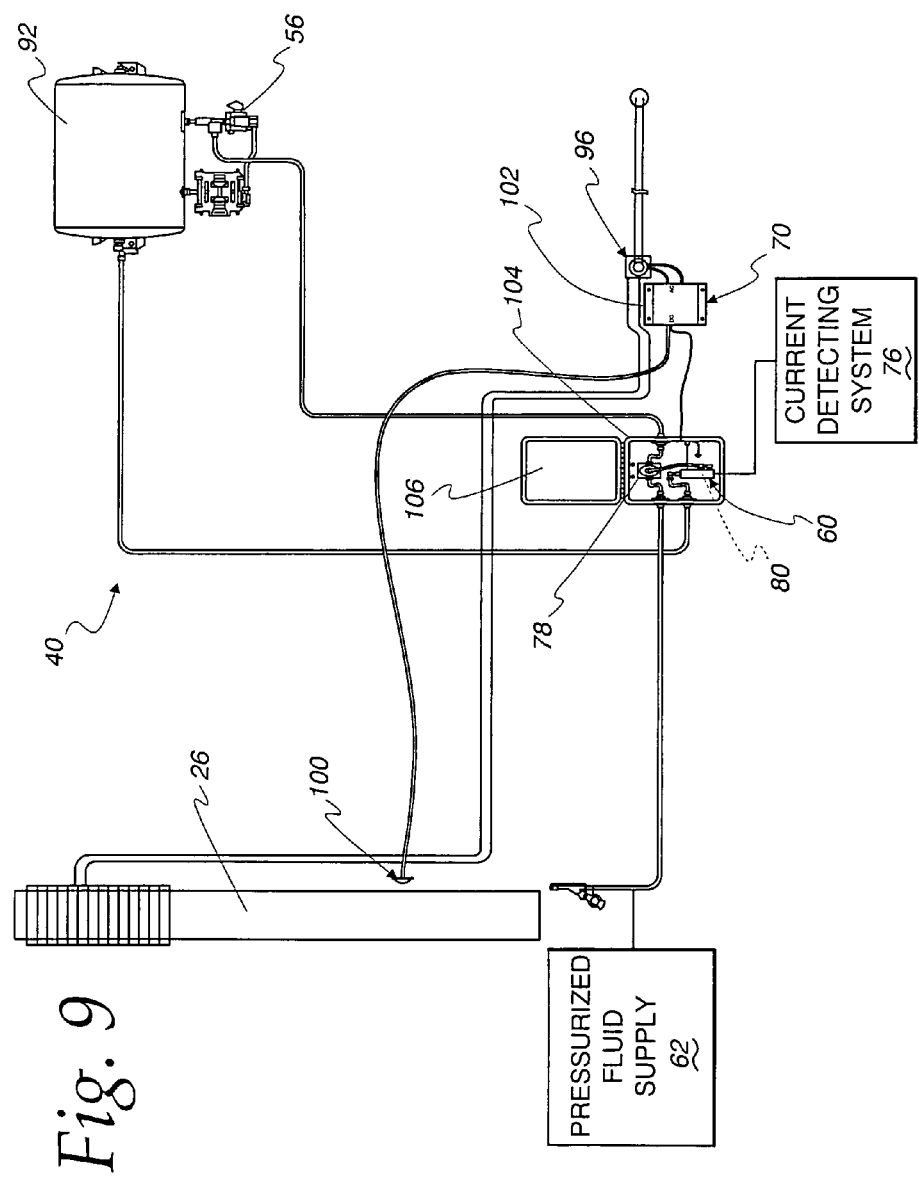

CARGO CARRYING VEHICLE WITH SAFETY SYSTEM FOR SHORE POWER CONNECTION

BACKGROUND OF THE INVENTION

1. Field of the Invention

This invention relates to cargo carrying vehicles and, more particularly, to a cargo carrying vehicle that has an electrical component thereon that is capable of being operated using an external power source.

2. Background Art

It is common to transport cargo in over-the-road vehicles within receptacles with air therein that is cooled or otherwise conditioned to preserve the particular cargo. A cooling component, such as an air conditioning system, is typically run on 120 volts AC. The vehicle will have its own generator to supply the required power to the air conditioning unit and/or to any other component that is electrically powered.

Electrical power is required to operate these components in all sizes of vehicles. Most commonly, air treatment components are used in larger vehicles, such as semi-trailer trucks. Semi-trailer trucks typically have diesel engines that are used both to drive the vehicle and cause the generation of power supplied to the electrically driven components.

In the process of transporting cargo, semi-trailer trucks will often be parked by their operators, potentially for relatively lengthy periods. As an example, an operator may stop for a rest period of several hours. At an unloading terminal or location, the vehicle may be required to be parked for a significant time period before the cargo therein can be unloaded.

To avoid damage to, or perishing of, cargo contained within the vehicle, it is common to continuously operate the particular air conditioning components while the vehicle is "parked". To do so, the truck engine will be operated in an "idle" mode.

While idling a diesel engine minimizes fuel consumption, there still results therefrom a significant emission of pollutants into the air, which represents a significant environmental hazard. These emissions are significant enough that many states have introduced regulations that restrict operation of the engines in the idle mode as for purposes of powering electrical components that must be continuously operated.

This has led to the proliferation of "shore power" stations. Particularly in regulated states, at locations where semi-trailer trucks are regularly parked, provision is made to supply 120 volt AC power to these vehicles.

Many existing cargo carrying vehicles are already equipped with an external supply inlet through which power can be tapped at these supply stations. Typically, a length of cable will be provided at the station with an end thereof equipped with a releasable connector that can be engaged with a cooperating connector on the vehicle. The vehicle operator, or an attendant, can relatively quickly establish the connection and initiate the power supply that continues through the parking period. This allows the operator to shut down the vehicle engine.

When the operator is ready to depart the station, the operator, or an attendant, will turn off the external power supply and disconnect the supply cable end from the vehicle. Power to the electrical components can then be re-supplied by the vehicle's own generator.

Vehicle operators have routinely used shore power at terminal locations. However, the en route conversion to shore power is a concept that is relatively new. As a result, an operator may forget that his/her vehicle is connected to shore power and depart from a parking location without disconnecting the power supply lead. This could have significant economic, and potentially dangerous, consequences.

One possible outcome is that the cable lead will be snapped or the connector components damaged or destroyed as the vehicle separates from the station. Depending upon the nature of the connection, the vehicle itself might be damaged and/or a significant component at the shore power station may be damaged or destroyed.

Aside from necessitating repairs, rupturing of high voltage lines under a tensile force inherently represents a safety risk to individuals in the vicinity of the station.

Still further, a rupturing of the line or damaging of the connections may cause shorting that could damage a powered component on the vehicle. This may necessitate immediate repairs that may not be practical or possible. As a result, the operator risks the loss of potentially an entire cargo.

To date, the effective and safe use of shore power has relied upon the operator's appropriate connection and disconnection of the shore power. However, a simple lapse in memory or judgment could have significant consequences. The industry continues to rely primarily upon the judgment and performance of vehicle operators to avoid such situations.

SUMMARY OF THE INVENTION

In one form, the invention is directed to a cargo carrying vehicle with a towing unit and a storage unit defining a cargo space. The towing unit is operable to: a) advance the storage unit; and b) generate electrical power for operating at least one component on the vehicle. The cargo carrying vehicle further includes a braking system that is placed selectively in applied and released states. In the applied state, the braking system prevents the storage unit from being advanced by the towing unit. The invention further includes an input for external power to be supplied to at least one of: a) charge; and b) operate the at least one component. A safety system is provided having first and second states. With the safety system in the first state, no external power is supplied to the external power input and the towing unit is allowed to be operated to advance the storage unit. With the safety system in the second state, external power is supplied to the external power input and the towing unit is prevented from being operated to advance the storage unit.

In one form: a) with no external power supplied to the external power inlet and the safety system in the first state, the safety system permits the braking system to be changed from the applied state into the released state; and b) with external power supplied to the external power inlet and the safety system in the second state, the braking system is prevented by the safety system from being changed from the applied state into the released state.

In one form, the towing unit is a truck with a diesel engine.

In one form, the at least one operating component is one of: a) a heating unit; and b) a refrigeration unit for conditioning air within the cargo space.

In one form, the vehicle is supported upon a wheeled frame and the braking system includes at least one pneumatically controlled brake block that is pressed against one wheel on the wheeled frame with the braking system in the applied state.

In one form, the safety system includes a control valve having first and second states and a current detecting system. The current detecting system causes the control valve to assume its first state with external power supplied to the external power input and current flow from externally supplied power detected by the current detecting system, as an incident of which the braking system is caused to be maintained in the applied state.

In one form, the braking system includes a supply of pressurized fluid and a brake valve that is operated to cause the braking system to be changed from the applied state into the released state. The current detecting system causes the control valve to assume its second state with no external power supplied to the external power input. With the control valve in its first state, fluid from the pressurized fluid supply is caused to be diverted by the control valve from the brake valve so that the braking system is maintained in the applied state. With the control valve in its second state, fluid from the pressurized fluid supply is caused to be directed by the control valve to the brake valve so that the braking system is changed from the applied state into the released state.

In one form, the control valve includes an electrically activated solenoid component that repositions between: a) a first position with the control valve in its first state; and b) a second position with the control valve in its second state.

In one form, the safety system further includes a step down transformer that converts current from one voltage at the external power inlet to a lower current for operating the control valve.

In one form, the cargo carrying vehicle includes an indicator system that generates a signal that can be audibly or visually detected by an operator as an incident of there being external power supplied at the external power inlet.

In one form, the safety system includes a container with a receptacle and an electrical extension cord with opposite ends. The extension cord can be stored in the receptacle. The safety system is in its second state with one end of the extension cord connected to the external power input.

In one form, the safety system is in its first state with the extension cord in a stored state within the receptacle.

In one form, the container has a closed state and an open state, and the safety system is in its first state with the extension cord in a stored state within the receptacle and the container in a closed state.

In one form, the braking system is in the form of a parking brake.

The invention is further directed to a method of delivering electrical power from an external power supply to a cargo carrying vehicle having at least one component that is electrically powered or charged through an external power input. The method includes the steps of: a) providing a safety system; b) connecting a lead from the external power supply to the external power input to thereby supply power to the at least one component to effect at least one of powering and charging of the at least one component; and c) as an incident of connecting the lead, causing the safety system to at least one of: i) prevent driving of the cargo carrying vehicle; and ii) generate a signal that can be audibly or visually detected by an operator at a location spaced from the external power input.

In one form, the cargo carrying vehicle is supported upon a wheeled frame and the step of causing the safety system to prevent driving of the cargo carrying vehicle involves causing braking of at least one wheel on the wheeled frame.

In one form, the braking system includes a pneumatically operated brake valve and the step of causing braking of the at least one wheel involves controlling delivery of pressurized fluid from a supply thereof to the brake valve.

In one form, the method further includes the step of sensing an electrical current generated by the external power supply through the safety system and as an incident thereof causing the safety system to at least one of: a) prevent driving of the cargo carrying vehicle; and b) generate a signal that can be audibly or visually detected by an operator at a location spaced from the external power input.

In one form, the step of providing a safety system involves providing a container with a receptacle and an electrical extension cord with opposite ends that can be stored in the receptacle. The safety system is caused to prevent driving of the cargo carrying vehicle with one end of the extension cord connected to the external power input and the other end of the extension cord connected to the external power supply.

In one form, the step of providing a container involves providing a container with closed and open states and the step of providing a safety system involves providing a safety system that allows the cargo carrying vehicle to be driven with the extension cord in a stored state within the receptacle and the container in the closed state.

BRIEF DESCRIPTION OF THE DRAWINGS

FIG. 8 is a schematic representation of the braking system on the cargo carrying vehicle in FIGS. 6 and 7 and with a control valve on the safety system incorporated;

FIG. 9 is a partially schematic representation of the braking and safety systems on the vehicle in FIGS. 6 and 7;

FIG. 10 is a schematic representation of cooperating connections between a cargo carrying vehicle and a cable on an external power supply;

DETAILED DESCRIPTION OF THE DRAWINGS

Figure 1:
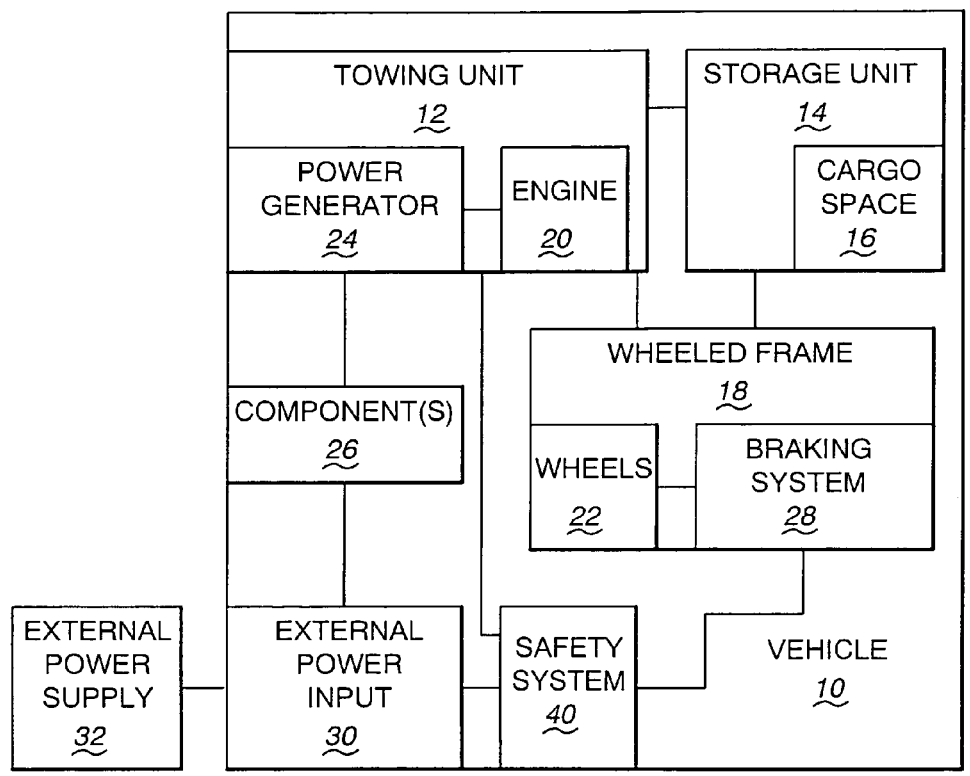
FIG. 1 is a schematic representation of a cargo carrying vehicle incorporating a safety system, according to the present invention.

The present invention is directed to a cargo carrying vehicle as shown schematically at 10 in FIG. 1. The cargo carrying vehicle 10 consists of a towing unit 12 and a storage unit 14 defining a space 16 for the storage of cargo to be transported by the vehicle 10.

The towing unit 12 and storage unit 14 can be made to move together as one piece, or as separate structures that are interconnected as described below, wherein the towing unit 12 draws the storage unit 14 as the towing unit 12 is driven.

In either construction, the towing unit 12 is operable to advance the storage unit 14. More specifically, the towing unit 12 and storage unit 14 are supported upon a wheeled frame 18. An engine 20 on the towing unit 12, through an appropriate drive train (not shown), turns a plurality of wheels 22 on the frame 18 to advance the vehicle 10.

The engine 20 also drives a power generator 24 that supplies power to at least one on-board component 26 to either operate or charge the component 26. The component 26 can take virtually an unlimited number of different forms. For example, the component 26 might be a refrigeration unit for conditioning the cargo space 16. As other, non-limiting examples, the component 26 might be an appliance, an electronic component, a television, or any other component, typically used on or in vehicles of the type shown, that requires an electrical power supply to either operate or be charged.

A braking system 28 on the vehicle 10 is operable to brake one or more of the wheels 22, with the braking system 28 in an applied state. The braking system 28 may be the vehicle's regular braking system or an emergency braking system. With the braking system 28 in a released state, the vehicle 10 can be driven by its operator 20.

An input 30 is provided on the vehicle 10 for power from an external supply 32. The external power supply 32 can be used to operate the component(s) 26 with the engine 20 shut down.

A safety system 40 is incorporated into the vehicle 10 and has first and second different states. The safety system 40 is in a first state with no external power supplied to the input 30. In this first state, the towing unit 12 is allowed to be operated/driven to advance the vehicle 10, including the storage unit 14. The safety system 40 is in its second state with external power supplied at the input 30. In this state, the safety system 40 prevents the towing unit 12 from being operated/driven to advance the vehicle 10, including the storage unit 14.

The components in FIG. 1 are shown in schematic form to encompass virtually a limitless number of different variations of the individual components shown therein. Further, the schematic showing is intended to encompass different relative locations of the depicted components. For example, the power generator 24 might be on the towing unit 12 or, alternatively, might be on or within the storage unit 14. The component(s) 26 may be anywhere upon and/or within the vehicle 10. Further, the external power input 30 and safety system 40 may be provided anywhere upon and/or within the vehicle 10 that best suits the configuration, and facilitates operation, thereof.

Figure 2:
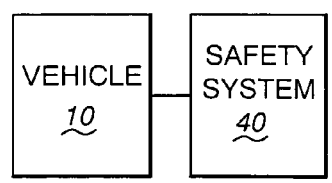
FIG. 2 is another schematic showing of the cargo carrying vehicle in FIG. 1 with the safety system incorporated.

Further, as shown in FIG. 2, the invention contemplates virtually an unlimited number of variations for the safety system 40 and its interaction with the vehicle 10. The invention is intended to encompass any configuration for the safety system 40 that interacts with one or more components on the vehicle 10 to preclude driving/advancement of the vehicle 10 with the external power supply 32 connected to the external power input 30. As just examples, the engine 20 might be prevented from operating by the safety system 40 or the braking system 28 might be placed in the applied state therefor with the external power supply 32 connected to the external power input 30.

Figure 3:
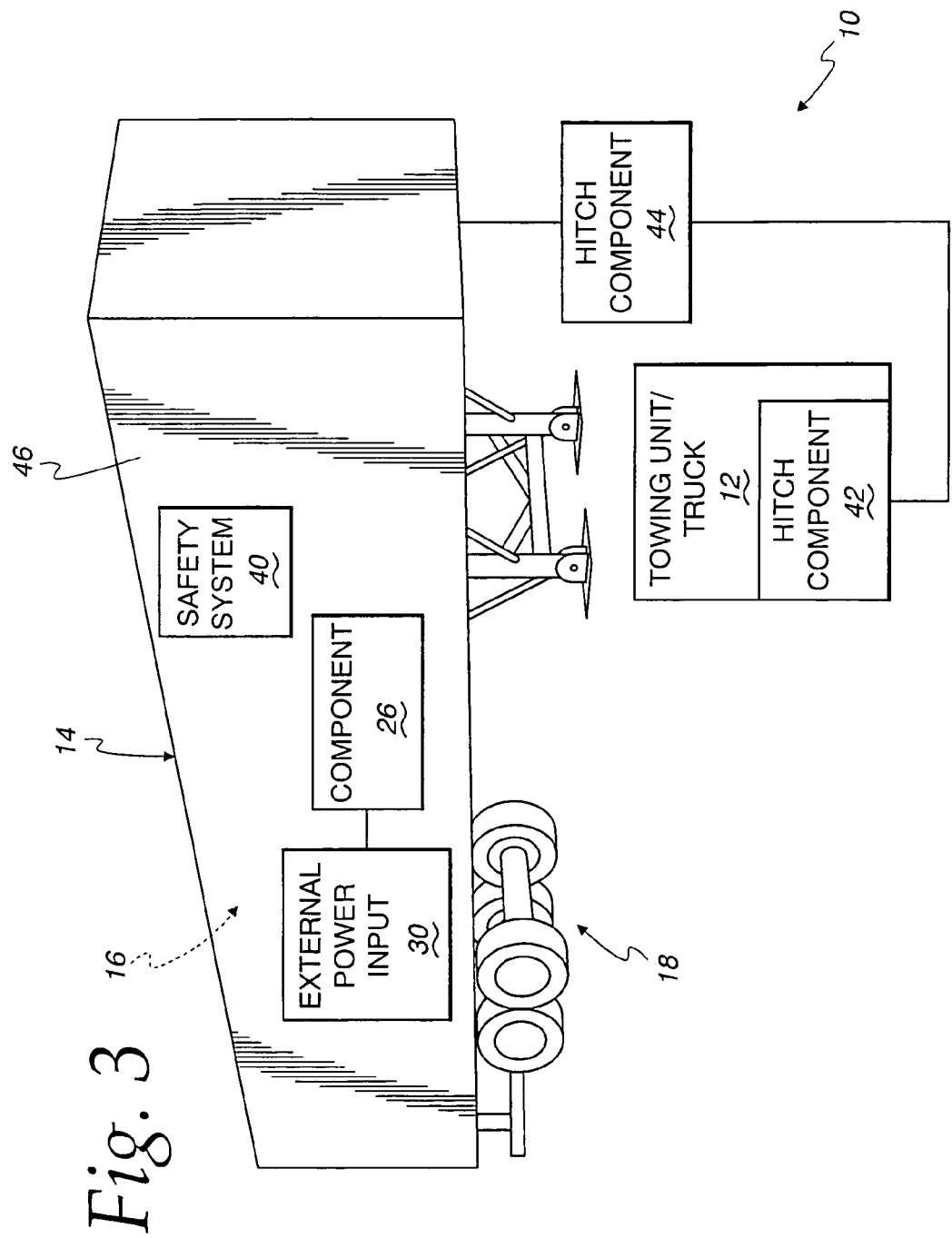
FIG. 3 is a partially schematic representation of one form of cargo carrying vehicle, as shown in FIGS. 1 and 2, from one perspective.
Figure 4:
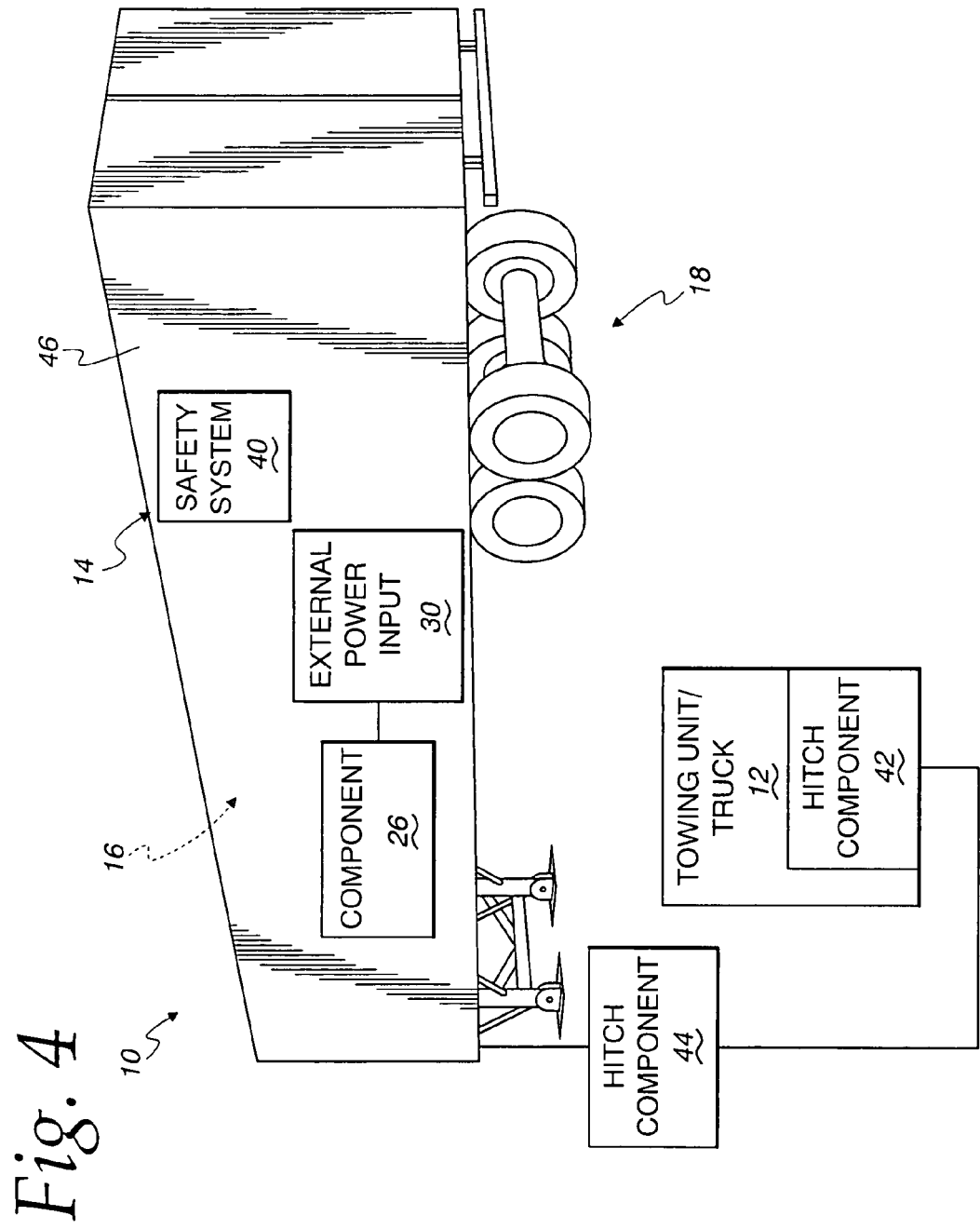
FIG. 4 is the view as in FIG. 3 from another perspective.

One exemplary form of the vehicle 10 is shown, partially in schematic form, in FIGS. 3 and 4. The vehicle 10 is shown with the storage unit 14 in the form of a semi-trailer with a separate towing unit/truck 12. The towing unit 12 and storage unit 14 are joined through cooperating hitch components 42, 44, respectively on the towing unit/truck 12 and storage unit 14. The wheeled frame 18 is shown only as it is provided on the storage unit 14. The storage unit 14 has a squared container 46 that bounds the cargo space 16.

The external power input 30 is shown upon the container 46 but could be partially or fully upon the towing unit/truck 12.

The component 26 and the safety system 40 are likewise shown on the container 46. One or more additional components 26 might be provided on the towing unit/truck 12. The safety system 40 might be alternatively provided partially or fully upon the towing unit/truck 12.

Figure 5:
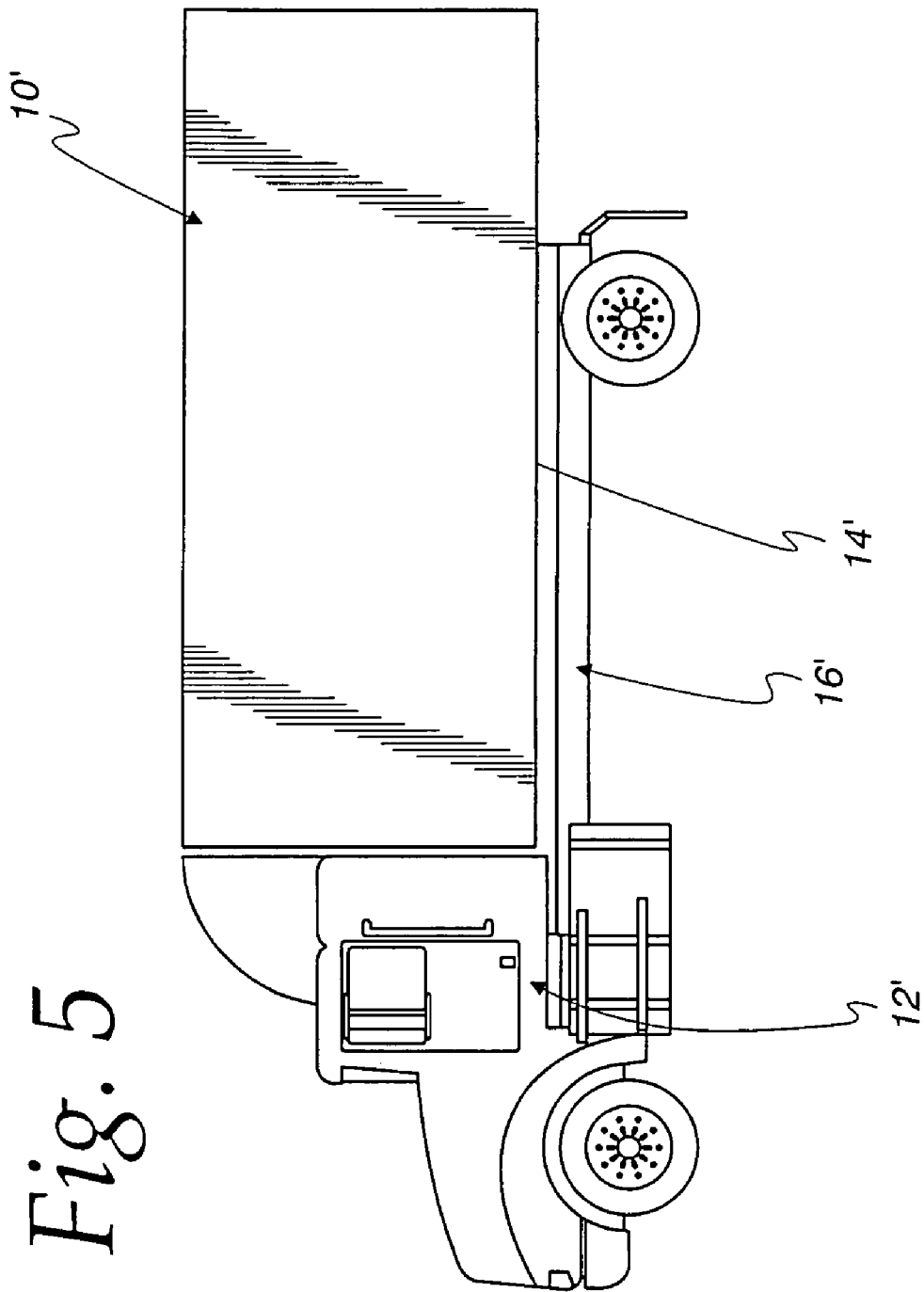
FIG. 5 is a side elevation view of another form of cargo carrying vehicle into which the present invention can be incorporated.

In an alternative form, as shown in FIG. 5, the vehicle 10' has the towing unit 12' and storage unit 14' constructed to move together as one piece upon a wheeled frame 16'. The operation of the invention is essentially identical, regardless of the configuration of the vehicle 10, 10'.

Details of one form of the safety system 40 are shown in FIGS. 6-12 as incorporated into the vehicle 10, as shown partially in schematic form in FIGS. 3 and 4. In this embodiment, the safety system 40 will be shown to interact with the braking system 28 at the rear of the vehicle 10, with its being understood that the safety system 40 might be integrated to similarly interact with a braking system 48 on wheels 50 on the towing unit/truck 12. The braking system 28, as previously noted, may be the vehicle's normal braking system or an emergency braking system.

The basic components of the braking system 28 are shown schematically in FIG. 8, to include a brake block 52 that is pressed against a wheel 22 with the braking system 28 in its applied state. A pneumatically-operated brake valve 56 is responsible for repositioning the brake block 52.

To place the brake assembly 28 in the applied state, the brake valve 56 is caused to be placed in a first state by a control valve 60, that is part of the safety system 40, with the control valve 60 in a corresponding first state. With the control vale 60 in its first state, pressurized fluid from a supply 62 thereof is controlled by the valve 60 so that the brake valve 56 assumes its first state, wherein the brake block 52 is pressed against the wheel 22.

With the control valve 60 in a second state, pressurized fluid from the supply 58 is controlled by the valve 60 in a manner that the brake valve 56 causes the brake block 52 to be separated from the wheel 22, representing the released state for the braking system 28. The braking system 28 may operate in similar fashion upon one or all of the wheels 22.

The braking system components are shown schematically to encompass any different constructions thereof wherein the state of the braking system 28 is controlled through pneumatically-operated components. The precise manner of operation is not critical to the present invention. One more specific form of the braking system 28 will be described below.

The safety system 40 consists primarily of the control valve 60, a power converter 70 with a step down transformer that converts current from one voltage from the supply 32 to a lower voltage/current, and a current detecting system 76 that may be part of the control valve 60 or an assembly separate therefrom. In this embodiment, the current detecting system 76 is incorporated into the valve 60 together with a pilot valve 78. The current detecting system 76 is integrated with an electrically actuated and repositionable solenoid component 80.

Figure 6:
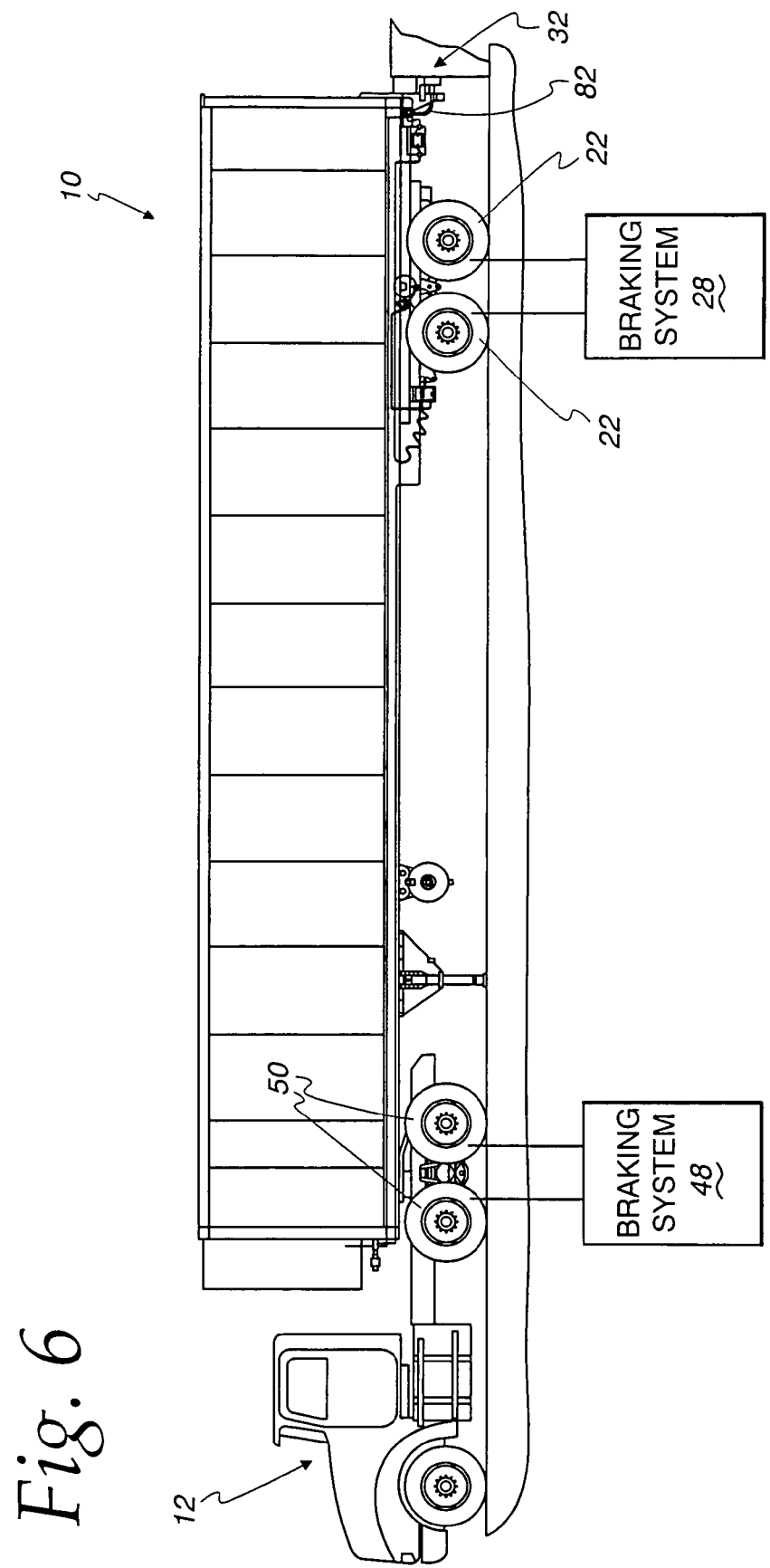
FIG. 6 is a side elevation view of a specific form of cargo carrying vehicle, as shown in FIGS. 1 and 2, with the inventive safety system incorporated.
Figure 7:
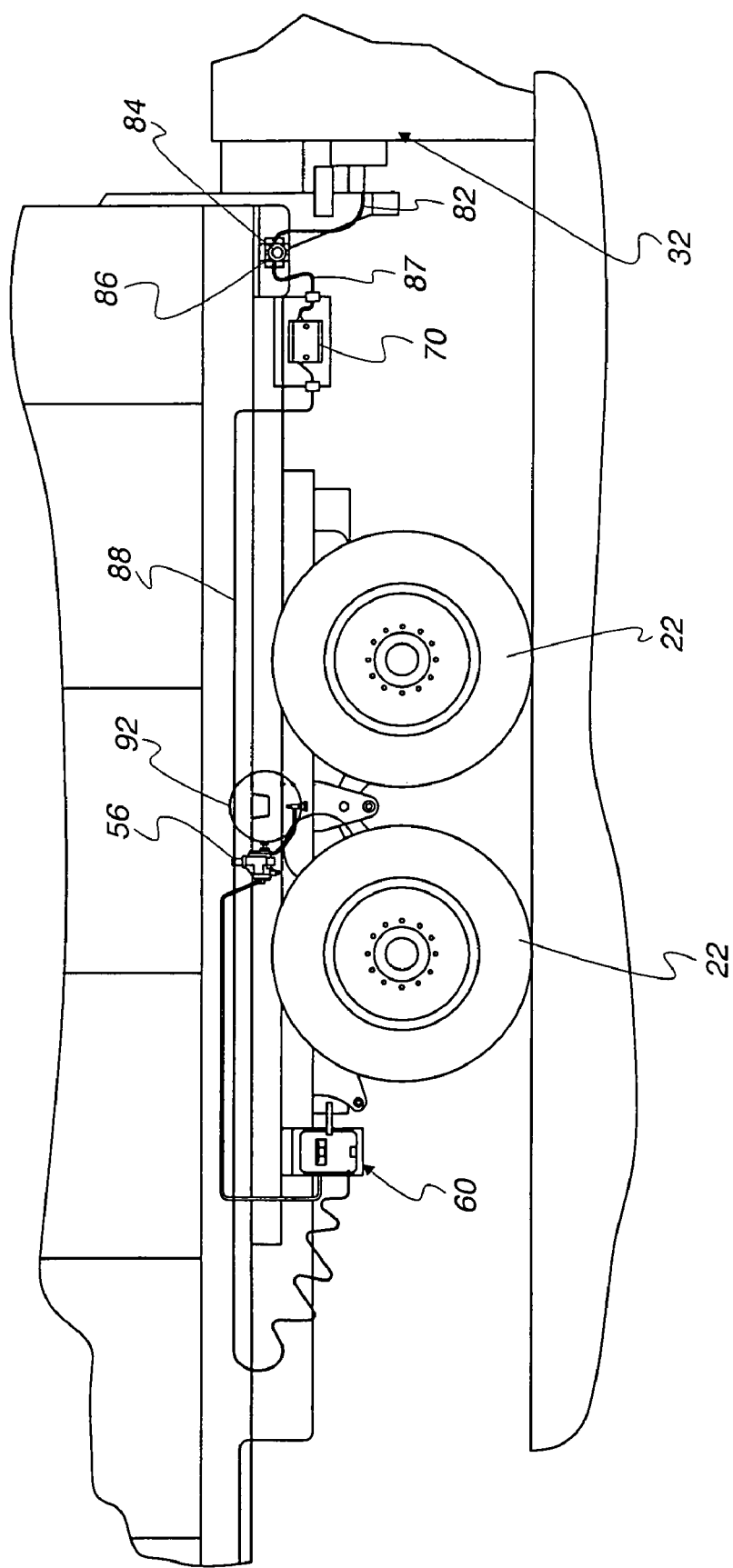
FIG. 7 is an enlarged, fragmentary, side elevation view of the cargo carrying vehicle in FIG. 6 and showing the safety system.
Figure 11:
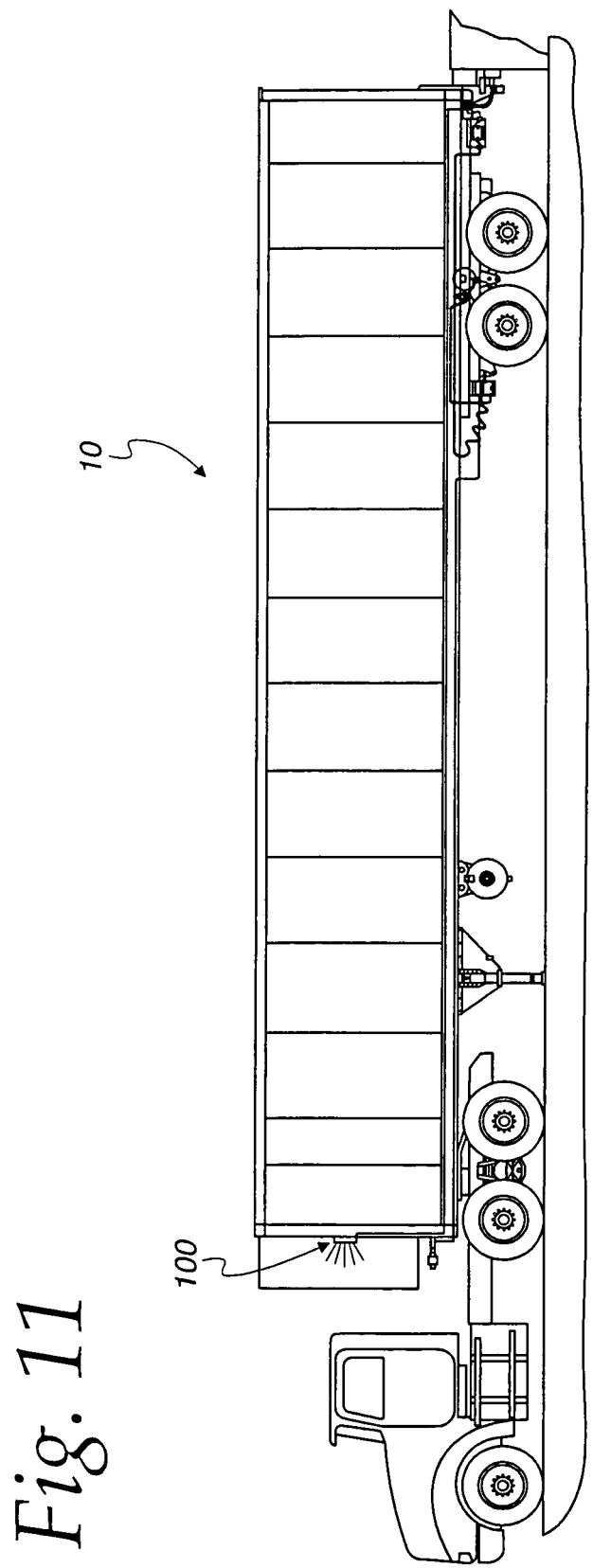
FIG. 11 is a side elevation view of the vehicle in FIGS. 6 and 7 and with an indicator system identifying for an operator that the vehicle is connected to an external power supply.

As shown schematically in FIG. 10, and in one specific form in FIGS. 6 and 7, the external power supply 32 has a cable 82 with a connector 84 that is releasably joined to a connector 86 on the vehicle 10 that defines part of the power input 30. An electrical path is defined through a line 87 from the power input/connector 86 to the power converter 70. The power input/connector 86 may be provided anywhere on the vehicle 10 and is shown in FIGS. 6 and 7 at the rear of the storage unit 14.

Typically, the power supply 32 will deliver power at 120 volts or 230 volts AC. Through the power converter 70, the voltage is converted to 12 volts DC.

With one exemplary design, as seen most clearly in FIGS. 6, 7 and 9, current flows through a line 88 from the power converter 70 to the control valve 60 and, more particularly, to the current detecting system 76 associated with the solenoid component 80. With the power supply 32 connected through the power input/connector 86, the 12 volt DC current flowing to the current detecting system 76 causes the control valve 60 to assume a first state, wherein the solenoid component 80 is in a first position. With the solenoid component 80 in its first position, pressurized fluid from the supply 62 thereof is blocked by the pilot valve 78 from communicating to the brake valve 56 as would allow the braking system 28 to be changed from the applied state into the released state.

With no external power supplied to the power input/connector 86, there is no current flow to the control valve 60 from the power converter 70, as a consequence of which the control valve 60 assumes a second state wherein the solenoid component 80 is in a second position. With the solenoid component 80 in its second position, fluid from the pressurized supply 62 is allowed to flow to the brake valve 56 that is thereby placed in its second state to change the braking system 28 from its applied state into its released state.

It is unnecessary to describe herein the structural details of the braking system 28 and its operation. The exemplary braking system 28 in FIGS. 6, 7 and 9 has a construction well known in the industry. Generally, a pressurized fluid reservoir 92 is provided in communication with the brake valve 56. The state of the brake valve 56 is changed by controlling a pressure differential between the fluid supplied from the reservoir 92 and that delivered from the supply 62. It suffices to say that the control valve 60 operates to control delivery of fluid from the supply 62 in a manner whereby the brake valve 56 is operated in the manner described above.

As can be seen most clearly in FIG. 9, power from the supply 32 is split at a component 96 to be delivered to the component 26, shown as a refrigeration component, and the power converter 70. From the power converter 70, the lower voltage DC power output can be split to be directed to the control valve 60 and a separate indicator system 100, as seen additionally in FIG. 11. The indicator system 100 can incorporate any component that generates a signal that can be audibly or visually detected by an operator as an incident of there being external power supplied at the power input/connector 86, which causes the DC current to flow from the power converter 70 to each of the control valve 60 and indicator system 100.

The components of the power converter 70 and control valve 60 may be enclosed in waterproof housings 102, 104, respectively. The housing 104 has a cover 106 that can be repositioned from a closed state to allow access to the components within the housing 104.

Figure 12:
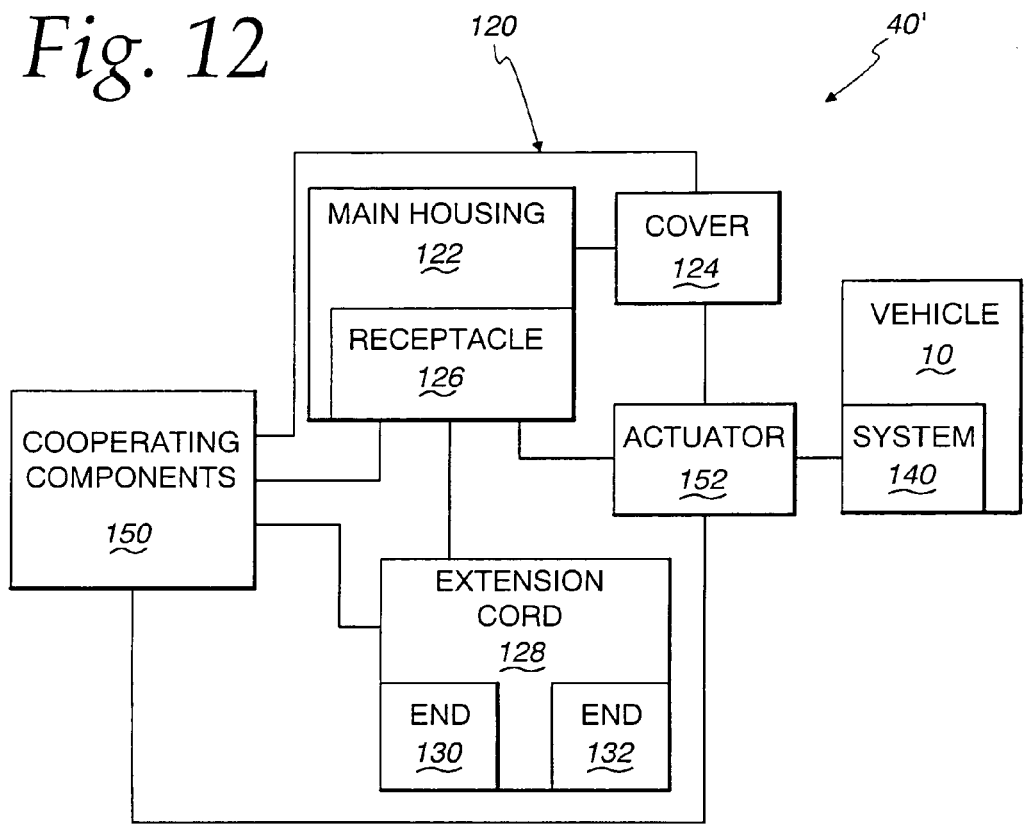
FIG. 12 is a schematic representation of another form of the safety system that consists of a container for an extension cord.

In another form of the safety system, as shown at 40' in FIG. 12, a container 120 is provided having a main housing 122 and a cover 124. The main housing 122 defines a receptacle 126 for an extension cord 128 having spaced ends 130, 132. The cover 124 is repositionable relative to the main housing to place the container 120 selectively in open and closed states. In the former state, the extension cord 128 can be placed into and removed from the receptacle 126. In the latter state, the extension cord 128 is safely confined within the receptacle 126.

The container 120 is operatively associated with a system 140 on the vehicle 10, that may be any system 140 that is capable of preventing driving of the vehicle 10. For example, the system 140 may be the braking system 28, an engine lockout system, etc.

With the extension cord 128 in the receptacle 126 and the cover 124 situated so that the container 120 is in a closed state, cooperating components, shown collectively at 150 in FIG. 12, interact in a manner to cause an actuator 152 to assume a state wherein the vehicle 10 can be driven in a normal manner.

In the event that either the extension cord 128 is removed from the receptacle 126, and/or the cover 124 is repositioned so that the container 120 is in its open state, the components 150 interact to cause the actuator 152 to change a state of the system 140 whereby the vehicle 10 cannot be driven.

Accordingly, if an operator has the extension cord ends 130, 132 connected to the power input/connector 86 and external power supply 32, the vehicle 10 will not be drivable. By disconnecting the extension cord 128 and replacing the same in the receptacle 126, the state of the actuator 152 is changed so that the vehicle 10 can be driven. As noted above, the system may be designed so that the cover 124 must also be repositioned to place the container 120 in a closed state before the vehicle 10 can be operated.

Figure 13:
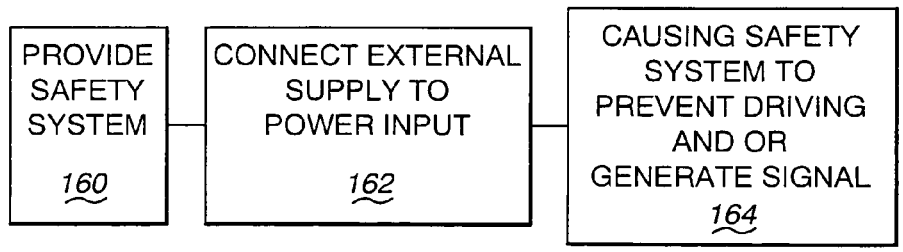
FIG. 13 is a flow diagram representation of a method of delivering electrical power from an external power supply to a vehicle, according to the invention.

With the inventive structure, described above, a method of delivering power from the external power supply 32 to the vehicle 10 can be carried out, as shown in block diagram form in FIG. 13. More particularly, as shown at block 160, a safety system is provided. As shown at block 162, a lead from the external power supply 32 is connected to the power input/connector 86 to thereby supply power to at least one component 26 to effect powering and/or charging of the at least one component 26. As shown at block 164, as an incident of connecting the lead, the safety system 40 is caused to at least one of: a) prevent driving of the vehicle; and b) generate a signal that can be audibly or visually detected by an operator at a location spaced from the input 86.

With this latter configuration, a signal can be generated that can be detected by an operator as from within the towing unit 12 or any other location where the operator is likely to hear or see the generated signal before attempting to drive the vehicle 10 with the vehicle still on shore power.

The foregoing disclosure of specific embodiments is intended to be illustrative of the broad concepts comprehended by the invention.

The invention claimed is:

1. A cargo carrying vehicle comprising:
a towing unit;
a storage unit defining a cargo space,
the towing unit operable to: a) advance the storage unit; and b) generate electrical power for operating at least one component on the vehicle;
a braking system that is placed selectively in applied and released states,
the braking system in the applied state preventing the storage unit from being advanced by the towing unit;
an input for external power to be supplied to at least one of: a) charge; and b) operate the at least one component; and
a safety system having first and second states,
the safety system in the first state with no external power supplied to the external power input and allowing the towing unit to be operated to advance the storage unit,
the safety system in the second state with external power supplied to the external power input and preventing the towing unit from being operated to advance the storage unit.

2. The cargo carrying vehicle according to claim 1 wherein: a) with no external power supplied to the external power inlet and the safety system in the first state, the safety system permits the braking system to be changed from the applied state into the released state; and b) with external power supplied to the external power inlet and the safety system in the second state, the braking system is prevented by the safety system from being changed from the applied state into the released state.

3. The cargo carrying vehicle according to claim 2 wherein the towing unit comprises a truck with a diesel engine.

4. The cargo carrying vehicle according to claim 3 wherein the at least one operating component comprises one of: a) a heating unit; and b) a refrigeration unit for conditioning air within the cargo space.

5. The cargo carrying vehicle according to claim 2 wherein the vehicle is supported upon a wheeled frame, the braking system comprises at least one pneumatically controlled brake block that is pressed against one wheel on the wheeled frame with the braking system in the applied state.

6. The cargo carrying vehicle according to claim 5 wherein the safety system comprises a control valve having first and second states and a current detecting system, the current detecting system causing the control valve to assume its first state with external power supplied to the external power input and current flow from externally supplied power detected by the current detecting system, as an incident of which the braking system is caused to be maintained in the applied state.

7. The cargo carrying vehicle according to claim 6 wherein the braking system comprises a supply of pressurized fluid and a brake valve that is operated to cause the braking system to be changed from the applied state into the released state, wherein the current detecting system causes the control valve to assume its second state with no external power supplied to the external power input, wherein: a) with the control valve in its first state, fluid from the pressurized fluid supply is caused to be diverted by the control valve from the brake valve so that the braking system is maintained in the applied state; and b) with the control valve in its second state, fluid from the pressurized fluid supply is caused to be directed by the control valve to the brake valve so that the braking system is changed from the applied state into the released state.

8. The cargo carrying vehicle according to claim 7 wherein the control valve comprises an electrically activated solenoid component that repositions between: a) a first position with the control valve in its first state; and b) a second position with the control valve in its second state.

9. The cargo carrying vehicle according to claim 6 wherein the safety system further comprises a step down transformer that converts current from one voltage at the external power inlet to a lower current for operating the control valve.

10. The cargo carrying vehicle according to claim 2 further comprising an indicator system that generates a signal that can be audibly or visually detected by an operator as an incident of there being external power supplied at the external power inlet.

11. The cargo carrying vehicle according to claim 1 wherein the safety system comprises a container with a receptacle and an electrical extension cord with opposite ends that can be stored in the receptacle and the safety system is in its second state with one end of the extension cord connected to the external power input.

12. The cargo carrying vehicle according to claim 11 wherein the safety system is in its first state with the extension cord in a stored state within the receptacle.

13. The cargo carrying vehicle according to claim 11 wherein the container has a closed state and an open state, and the safety system is in its first state with the extension cord in a stored state within the receptacle and the container in a closed state.

14. The cargo carrying vehicle according to claim 2 wherein the braking system comprises a parking brake.

15. A method of delivering electrical power from an external power supply to a cargo carrying vehicle having at least one component that is either electrically powered or charged through an external power input on the vehicle, the method comprising the steps of:
providing a safety system;
connecting a lead from the external power supply to the external power input to thereby supply power to the at least one component to effect at least one of powering and charging of the at least one component; and
as an incident of connecting the lead, causing the safety system to at least one of: a) prevent driving of the cargo carrying vehicle; and b) generate a signal that can be audibly or visually detected by an operator at a location spaced from the external power input.

16. The method of delivering electrical power from an external power supply to a cargo carrying vehicle according to claim 15 wherein the cargo carrying vehicle is supported upon a wheeled frame and the step of causing the safety system to prevent driving of the cargo carrying vehicle comprises causing braking of at least one wheel on the wheeled frame.

17. The method of delivering electrical power from an external power supply to a cargo carrying vehicle according to claim 16 wherein the braking system comprises a pneumatically operated brake valve and the step of causing braking of the at least one wheel comprises controlling delivery of pressurized fluid from a supply to the brake valve.

18. The method of delivering electrical power from an external power supply to a cargo carrying vehicle according to claim 15 further comprising the step of sensing an electrical current generated by the external power supply through the safety system and as an incident thereof causing the safety system to at least one: a) prevent driving of the cargo carrying vehicle; and b) generate a signal that can be audibly or visually detected by an operator at a location spaced from the external power input.

19. The method of delivering electrical power from an external power supply to a cargo carrying vehicle according to claim 15 wherein the step of providing a safety system comprises providing a container with a receptacle and an electrical extension cord with opposite ends that can be stored in the receptacle and the safety system is caused to prevent driving of the cargo carrying vehicle with one end of the extension cord connected to the external power input and the other end of the extension cord connected to the external power supply.

20. The method of delivering electrical power from an external power supply to a cargo carrying vehicle according to claim 19 wherein the step of providing a container comprises providing a container with closed and open states and the step of providing a safety system comprises providing a safety system that allows the cargo carrying vehicle to be driven with the extension cord in a stored state within the receptacle and the container in the closed state.

* * * * *